United States Patent [19]
Terahara

[11] Patent Number: 5,841,571
[45] Date of Patent: Nov. 24, 1998

[54] OPTICAL RECEIVER HAVING A FUNCTION FOR SUPPRESSING USELESS INTENSITY MODULATION COMPONENTS

[75] Inventor: Takafumi Terahara, Kawasaki, Japan

[73] Assignee: Fujitsu Limited, Kawasaki, Japan

[21] Appl. No.: 618,209

[22] Filed: Mar. 19, 1996

[30] Foreign Application Priority Data

Jun. 20, 1995 [JP] Japan ..................................... 7-153075

[51] Int. Cl.$^6$ .......................... H04B 10/14; H04B 10/16
[52] U.S. Cl. .......................... 359/341; 359/156; 359/189
[58] Field of Search .................................. 359/156, 181, 359/189, 173, 341

[56] References Cited

U.S. PATENT DOCUMENTS

| | | | |
|---|---|---|---|
| 4,918,396 | 4/1990 | Halemane et al. | |
| 5,008,958 | 4/1991 | Cimini et al. | 455/619 |
| 5,117,303 | 5/1992 | Desurvire et al. | |
| 5,345,331 | 9/1994 | Bergano et al. | |
| 5,422,754 | 6/1995 | Naito | |
| 5,424,861 | 6/1995 | Koning | 359/156 |
| 5,479,423 | 12/1995 | Tanikawa | 359/337 |
| 5,526,162 | 6/1996 | Bergano | 359/181 |
| 5,563,731 | 10/1996 | Asahi | 359/341 |
| 5,611,005 | 3/1997 | Heismann et al. | 385/11 |

FOREIGN PATENT DOCUMENTS

| | | |
|---|---|---|
| 0502386A2 | 2/1992 | European Pat. Off. |
| 2257320 | 1/1993 | United Kingdom. |
| 2280561 | 2/1995 | United Kingdom. |

OTHER PUBLICATIONS

Bergano, et al., "Polarization Hole–Burning in Erbium–Doped Fiber–Amplifier Transmission Systems," AT&T Bell Laboratories ECOC 1994, vol. 2, pp. 621–628.

Heismann, et al., "Electrooptic Polarization Scramblers For Optically Amplified Long–Haul Transmission System" AT&T Bell Laboratories ECOC 1994, vol. 2, pp. 629–632.

*Primary Examiner*—Nelson Moskowitz
*Attorney, Agent, or Firm*—Staas & Halsey

[57] ABSTRACT

An optical receiver for suppressing a useless intensity modulation component having an optical to electrical converter for converting an optical main signal to an electrical signal, an identifying device for identifying the electrical signal converted in the optical to electrical converter, an optical amplifier for amplifying the optical main signal provided on a preceding stage of the optical to electrical converter, an electrical amplifier for amplifying the converted electrical signal for a main signal provided on a rear stage of the optical to electrical converter, and a capacitor coupled on the preceding stage of the electrical amplifier having a characteristic of a low cut-off frequency higher than a polarization scrambling frequency or a monitoring control signal frequency.

5 Claims, 16 Drawing Sheets

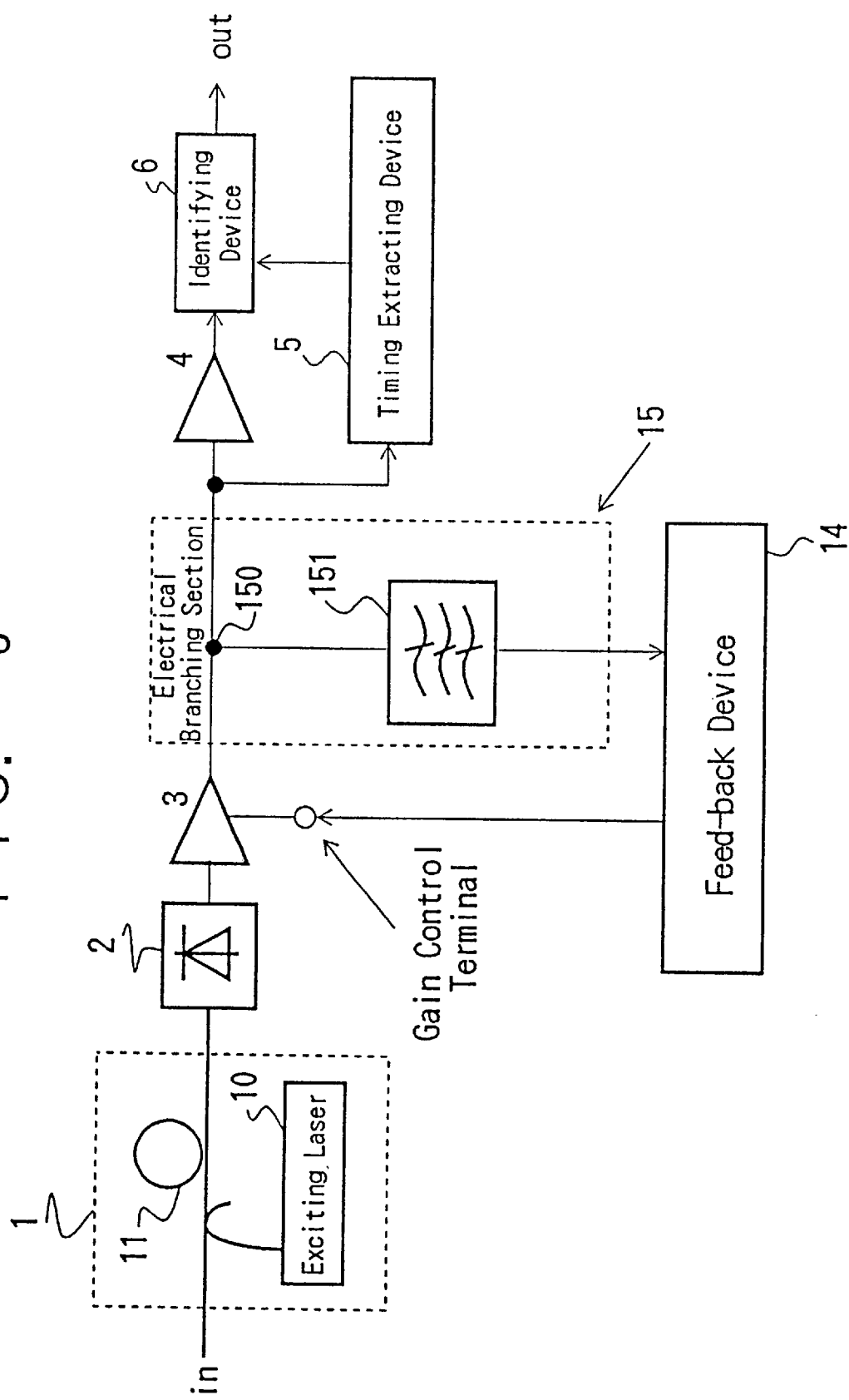

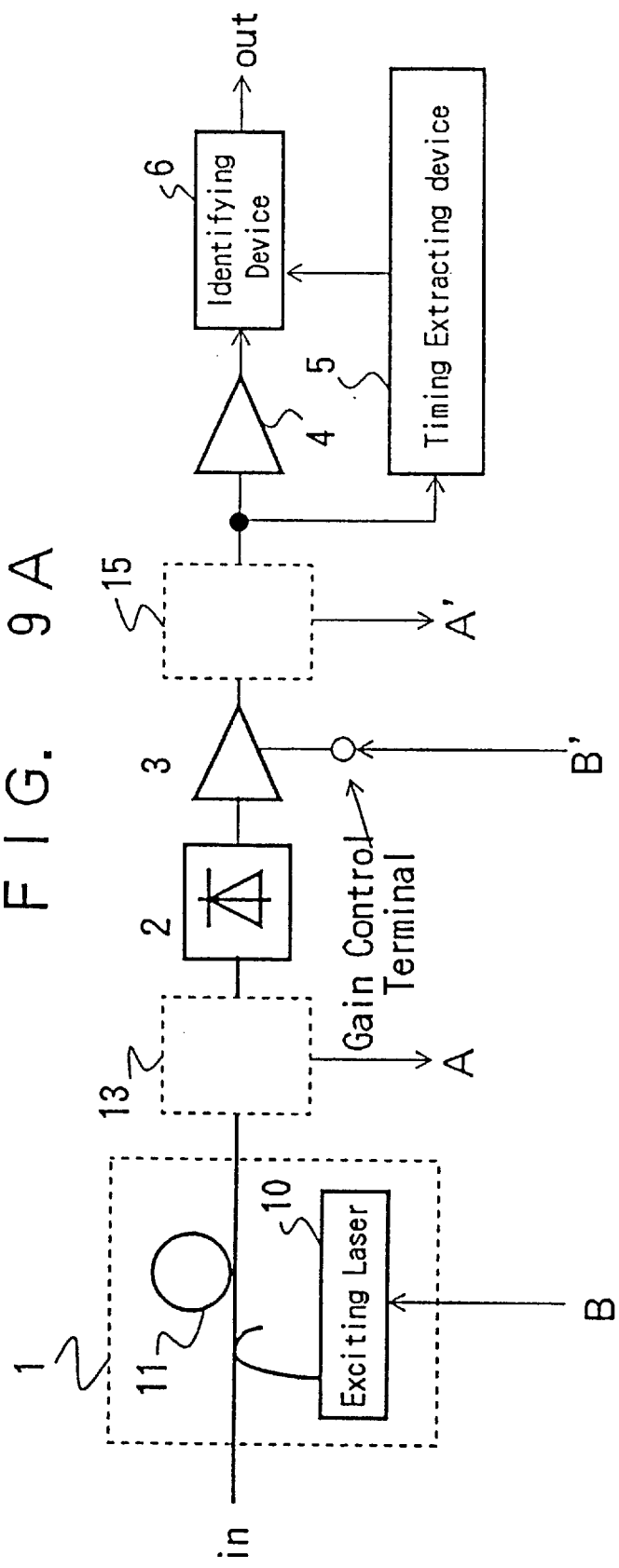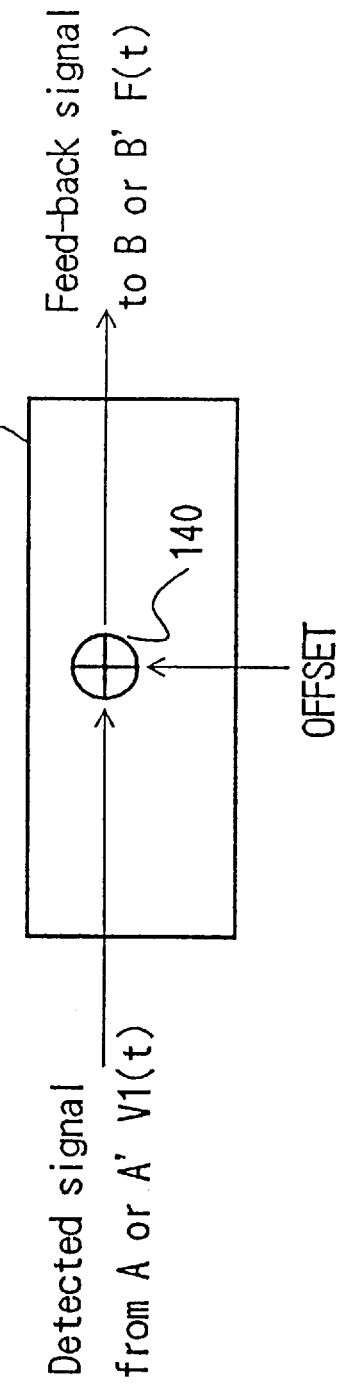

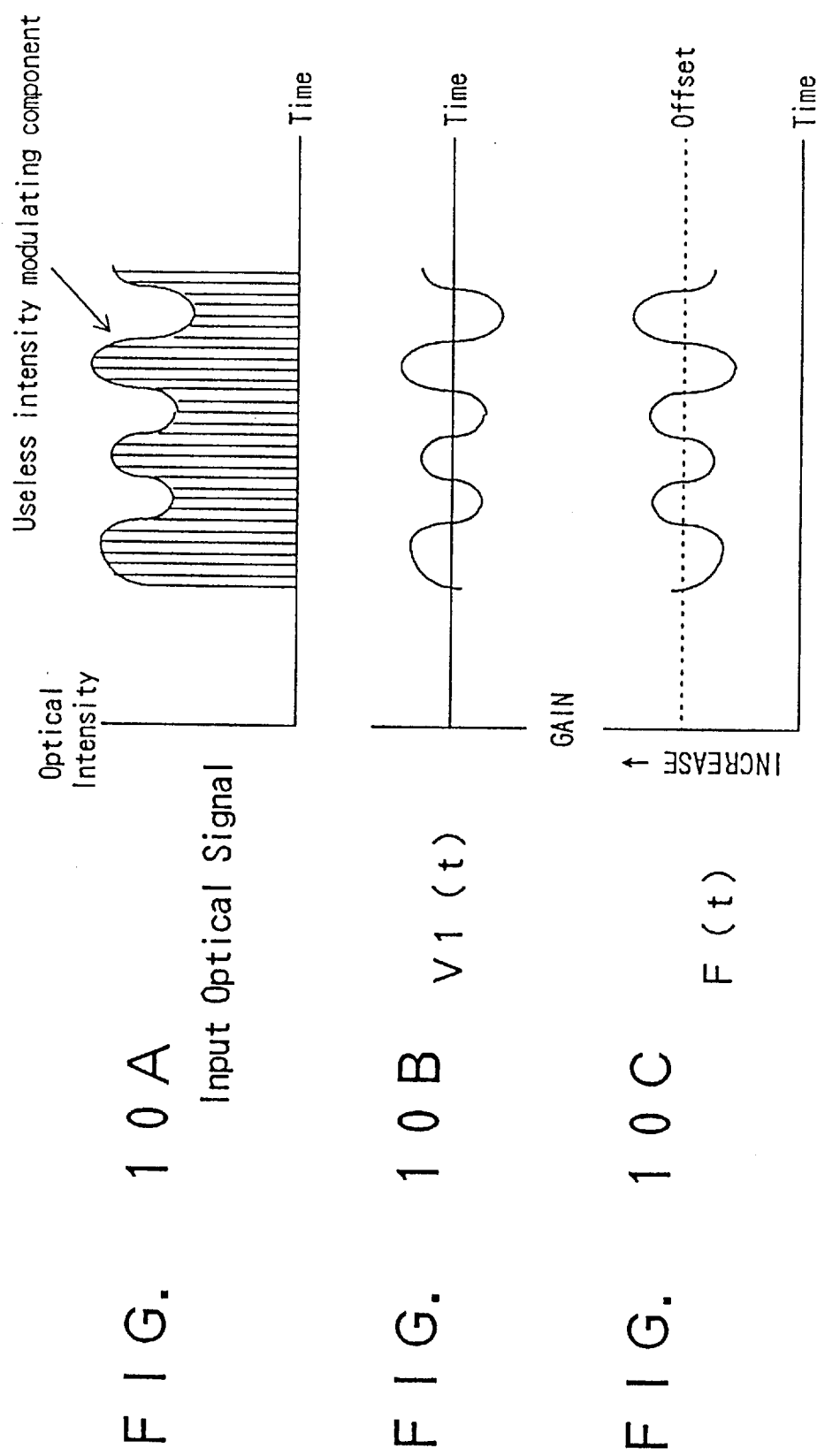

F I G. 1 2 A
INPUT SIGNAL LIGHT
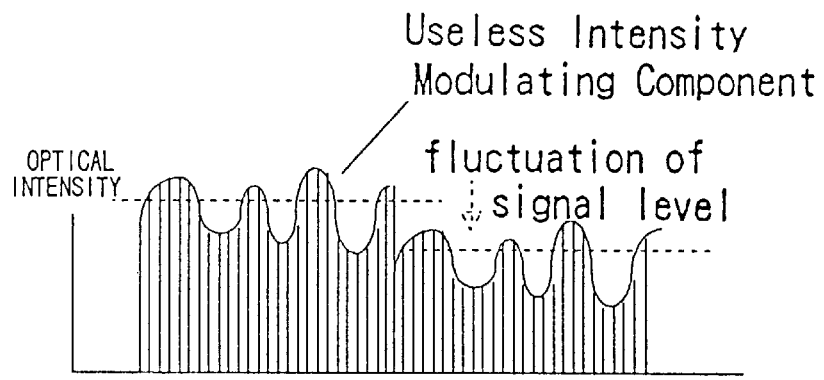
F I G. 1 2 B
USELESS INTENSITY
MODULATING COMPONENTS
V1(t)
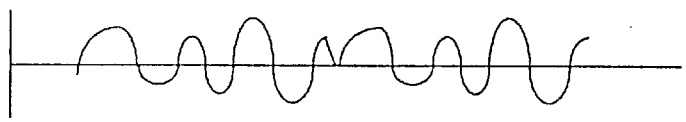
F I G. 1 2 C
SIGNAL LEVEL
DETECTED SIGNAL
V2(t)
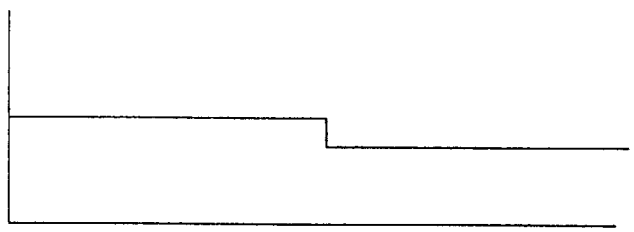
F I G. 1 2 D
FEED-BACK SIGNAL
F(t)
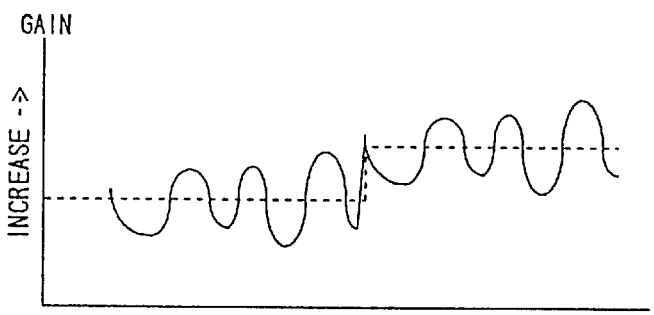

OPTICAL RECEIVER HAVING A FUNCTION FOR SUPPRESSING USELESS INTENSITY MODULATION COMPONENTS

BACKGROUND OF THE INVENTION

1. Field of the Invention

The present invention relates to an optical receiver having a function for suppressing useless intensity modulation components. More particularly, the present invention relates to an optical receiver provided on a transmitting terminal in a system for amplifying an optical signal to perform multi-repeating.

2. Description of the Related Art

In a system, which amplifies and repeats optical signals by multi staged amplifying repeaters, it is well-known that SN ratio of the optical signals received in a receiver terminal can be deteriorated where there is a polarization dependency in a gain of an optical amplifier the gain polarization dependency is provided at each of the amplifying repeaters.

An Erbium Doped Fiber (EDFA), which belongs to rare-earth doped fiber amplifiers, has a polarization Hole Burning (PHB) effect. The PHB effect is of the EDFA, is a main factor in causing gain polarization dependency.

To suppress the SN ratio deterioration, if polarization scrambling for changing input polarization condition in a speed higher than response speed of the PHB, i.e., modulating polarization, is performed, the effect of PHB can be reduced.

However, it is known that polarization modulation is converted to intensity modulation to generate useless intensity modulation components because of polarization dependency loss of passive parts employed in an optical amplifier, when the polarization scrambling is performed. For example, such the problem is described in "Polarization Hole-Burning in Erbium-Doped Fiber-Amplifier Transmission Systems" in ECOC '94, Proceedings Vol. 2 P621–628.

On the other hand, in an optical amplifying multi-repeaters system, a monitoring control signal is transmitted to each of the repeaters from a transmitter terminal to perform a monitoring control for the system. To realize the transmission system, a monitor control signal is piled to a main signal by employing several percentages of an intensity modulation.

FIGS. 1 and 2 are diagrams for explaining a structure of a conventional optical receiver and the above-described problems.

In FIG. 1, an optical receiver is formed by an optical pre-amplifier 1, an optical to electrical converter 2 for a main signal, electrical amplifiers 3 and 4, a timing extracting circuit 5, and an identifying device 6. The optical pre-amplifier 1 includes a laser optical source 10 for excision and a rare-earth-doped fiber 11. The rare-earth-doped fiber 11 may be an Erbium doped fiber, for example.

The rare-earth doped fiber 11 is formed as a traveling-wave type laser, in which a rare earth element ion is to make an optical excision according to the difference of an energy level. A semi-conductor laser having high output power is preferably employed as laser optical source 10.

An optical received signal amplified in optical pre-amplifier 1 is inputted to optical to electrical converter 2 for a main signal and converted to an electrical signal. The electrical signal converted in optical to electrical converter 2 for a main signal, of which sizes is amplified by a predetermined times, in electrical amplifiers 3 and 4, and inputted to an identifying device 6.

The timing extracting circuit 5 extracts a signal timing of the electrical signal branched from the amplifier 3. The identifying device 6 identifies the electrical signal by synchronizing the extracted signal timing.

FIG. 2 shows a frequency band characteristic of the optical receiver shown in FIG. 1. In FIG. 2, the axis of abscissas shows an intensity modulating frequency of an inputted optical signal, and the axis of ordinates shows a signal gain. In FIG. 2, (I) shows a frequency gain characteristic of a main signal.

A cut off frequency in the frequency gain characteristic of the main signal is set to extent 0.7 times of a bit rate of the main signal. Meanwhile, (II) shows a spectrum of the above-described modulating frequency fscr for polarization scrambling and monitor control signal modulating frequency fsv. The modulating frequency fscr for polarization scrambling and monitor control signal modulating frequency fsv are extent 10 KHz, for example, for a 10 GHz bit rate of the main signal. Accordingly, in FIG. 2, a spectrum for the fscr and fsv is shown as one common spectrum.

In this respect, in the conventional optical receiver, an intensity modulating component due to the modulating signal for polarization scrambling fscr or monitor control signal fsv is within the frequency characteristic band of the optical receiver. As a result, noise associated with the main signal is increased and it becomes a factor in the deterioration of a transmission characteristic.

SUMMARY OF THE INVENTION

Accordingly, it is an object of the present invention to provide an optical receiver for improving receiving characteristic by blocking or suppressing useless intensity modulating components for a main signal.

To realize the above-described object, an optical receiver comprises an optical to electrical converter for converting an optical main signal to an electrical signal and an identifying device for identifying the electrical signal converted by the optical to electrical converter has an optical amplifier for amplifying an optical main signal on the proceeding stage of the optical to an electrical converter and electrical an amplifiers for amplifying electrical signal for the converted main signal on the rear stage of the optical to electrical converter.

Further, in the optical receiver, on the precedent or rear stages of the electrical amplifier for the above-described main signal, or in the electrical amplifier, capacitors are coupled. The size of the capacitors is set so as that a cutoff low-frequency of a low-frequency cutoff characteristic becomes higher than a polarization scrambling frequency or a signal frequency for monitoring control. Therefore, it becomes possible for useless intensity modulating components not to pass through the main signal band.

It is another object of the present invention to provide an optical receiver having a device for detecting useless intensity modulating components in an optical signal group or an electrical signal group, wherein the intensity modulating component can be suppressed by feeding a detected signal back to a signal gain of the optical receiver.

It is further object of the present invention to provide an optical receiver, wherein it becomes possible to block or suppress the useless modulating components for a main signal by feeding the signal gain back to a driver current of the exciting laser in the optical amplifier, or feeding the gain back to a gain control of the electrical amplifier.

BRIEF DESCRIPTION OF THE DRAWINGS

FIG. 8 is a block diagram of a fifth embodiment of the present invention.

FIGS. 9A and 9B show a block diagram of a sixth embodiment of the present invention.

FIGS. 10A to 10C show an explanatory diagram of a characteristic of the embodiment shown in FIGS. 9A and 9B.

FIGS. 12A to 12D explain a characteristic of the embodiment shown in FIGS. 11A and 11B.

DESCRIPTION OF THE PREFERRED EMBODIMENTS

Figure 1:
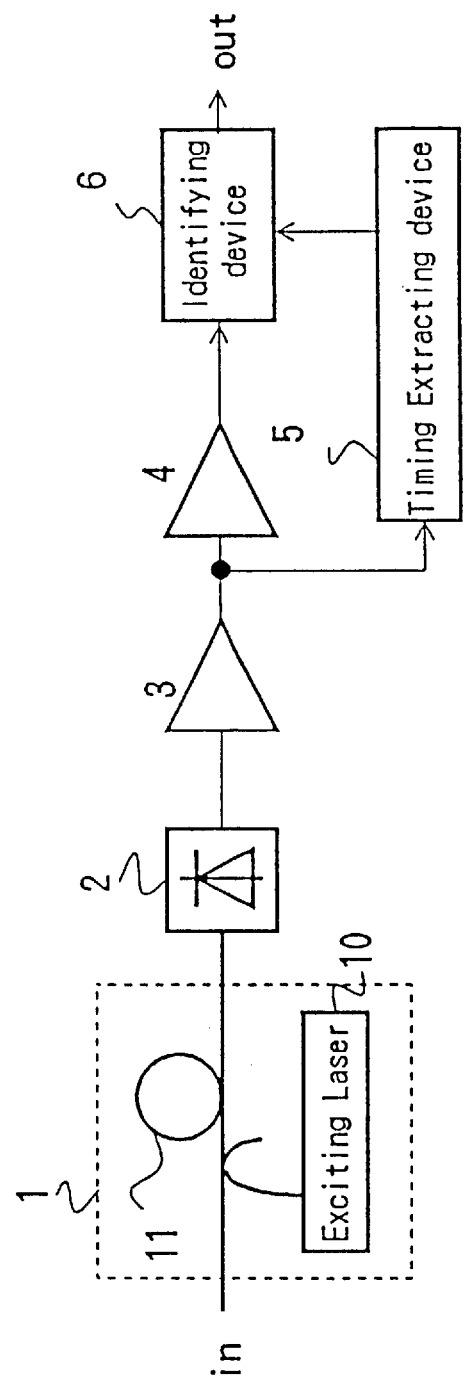
FIG. 1 shows a structural block diagram of the conventional optical receiver.
Figure 2:
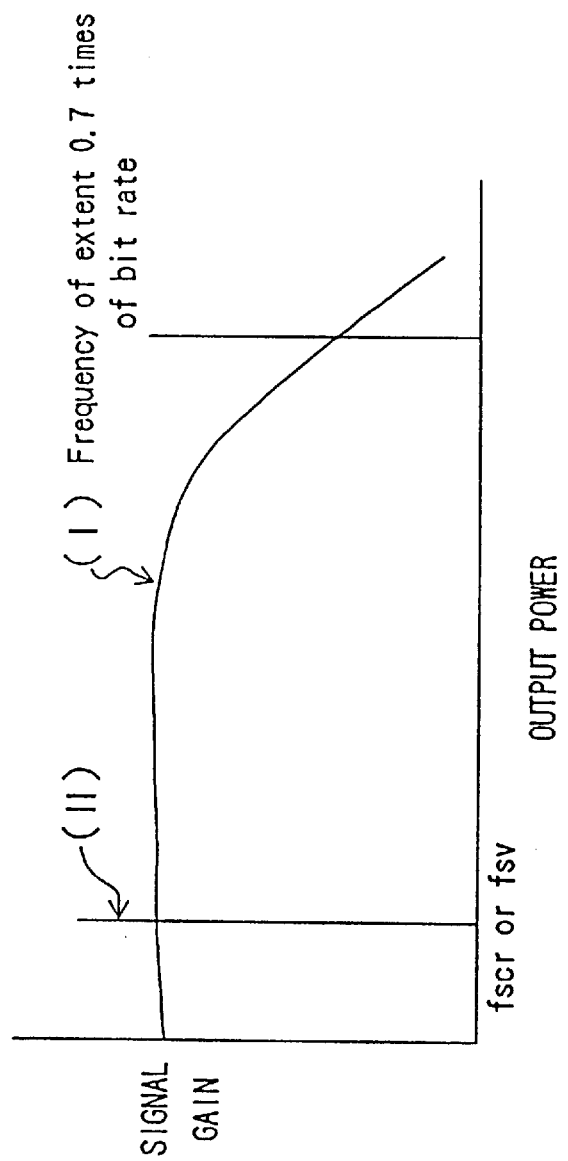
FIG. 2 is an explanatory diagram of a frequency band characteristic of the conventional optical receiver.

Throughout the following descriptions, the same reference numerals are used to denote and identify corresponding or identical components.

Figure 3:
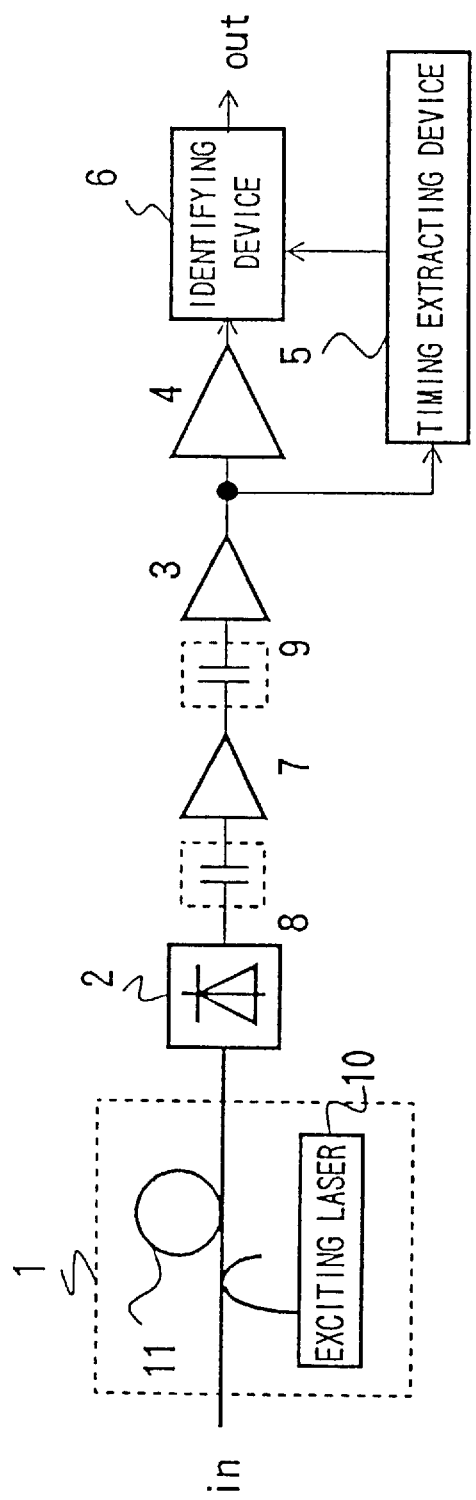
FIG. 3 is a block diagram of a first embodiment of the present invention.

FIG. 3 is a block diagram of a first embodiment of the present invention. Further, FIG. 4 is a diagram for explaining a frequency characteristic of the embodiment shown in FIG. 3.

In comparison with the structure of the conventional optical receiver shown in FIG. 1, a structure of the embodiment shown in FIG. 3 has an intermediate amplifier 7 positioned between an optical to electrical converter 1 and an amplifier 3. Capacitors 8 and 9 are provided on the input and output sides of the intermediate-amplifier 7.

Figure 4:
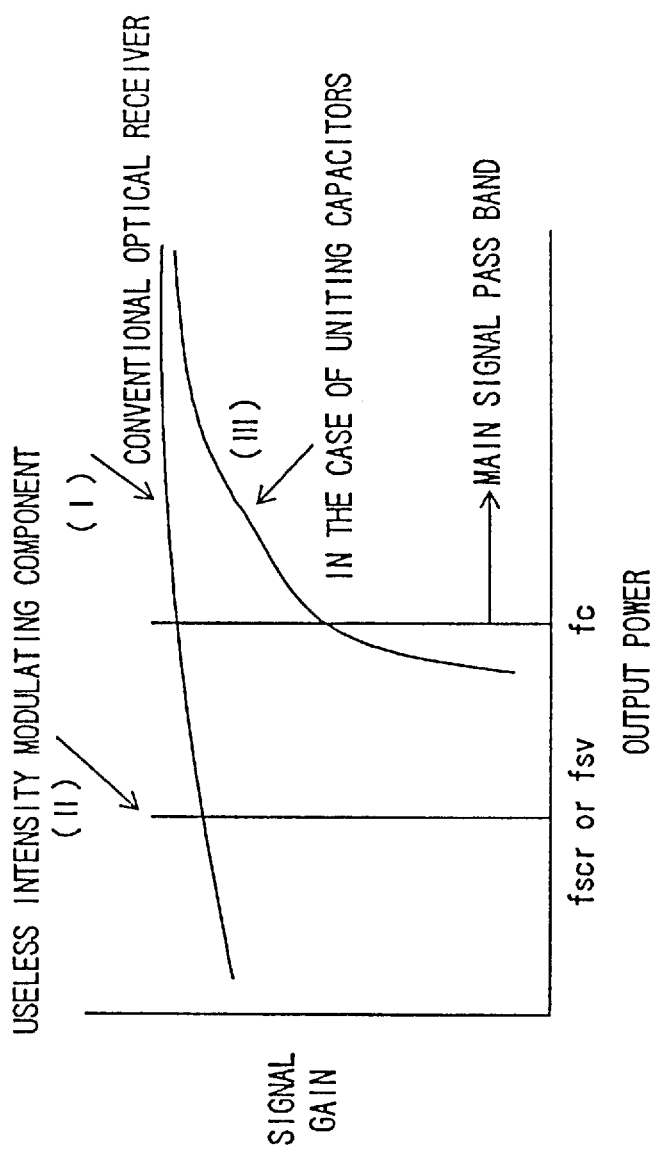
FIG. 4 is a diagram for explaining a characteristic of the conventional optical receiver shown in FIG. 1.

The structure of the first embodiment has a characteristic shown by (III), as compared with a characteristic shown by (I) of the main signal in the conventional optical receiver as shown in FIG. 4. That is, when the capacitors 8 and 9 are provided, the band characteristic of (III) can be obtained according to low-frequency cutoff fc found by a functional expression of fc ($=\frac{1}{2} \pi$ CR).

Accordingly, in a 50 Q group electrical circuit if R=50 Q, and C=0.3 $\mu$F are employed as one example, fc becomes 10 k Hz. If the polarization scrambling frequency fscr or monitor control signal frequency fsv is lower than the low-frequency cutoff fc, intensity modulating components may not pass through a main signal band. Therefore, it becomes possible to prevent the effect of useless intensity modulating components a main signal component.

When the electrical circuit is formed by discrete parts of the 50 Q group, it is possible to realize the low-frequency cutoff characteristic, if a blocking capacitor or the like sold on the market is connected.

In an optical receiver, in which a rare-earth doped fiber optical amplifier is employed as an optical pre-amplifier 1, an amplifying gain can be controlled by increasing and decreasing exciting optical power outputted from the exciting laser of the optical pre-amplifier 1. By employing this function, it is possible to suppress intensity modulating components by reducing the gain, when increasing the detected signals sent from the detector, and increasing the gain, when decreasing the detected signal.

Figure 5:
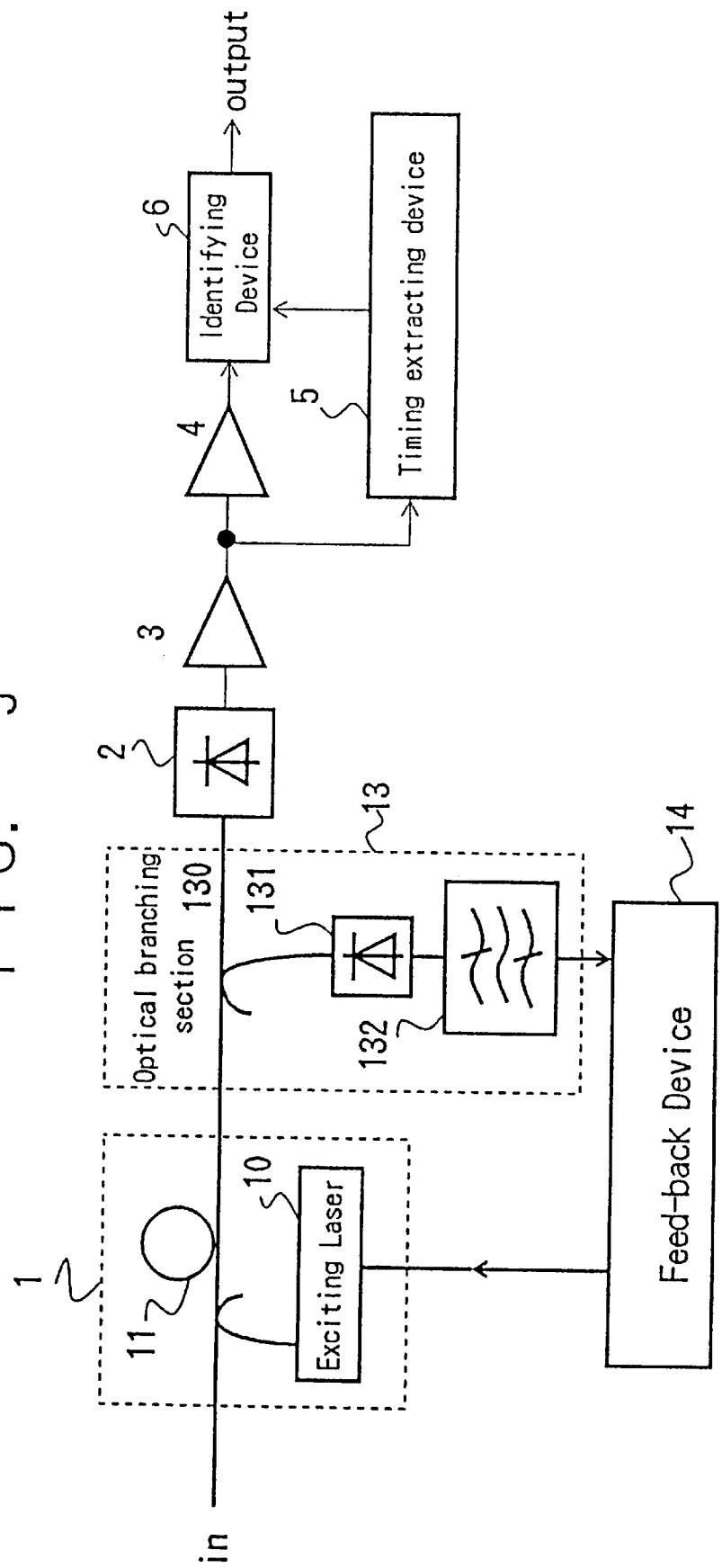
FIG. 5 is a block diagram of a second embodiment of the present invention.

FIG. 5 shows a structural example of a second embodiment of the present invention. The embodiment shown in FIG. 5 includes a useless intensity modulating component detector 13 and a feed-back circuit 14, as compared with the conventional example shown in FIG. 1.

The useless intensity modulating component detector 13 is provided between an optical pre-amplifier 1 and the optical to electrical converter 2 for a main signal. The detector 13 includes an optical branching section 130, an optical to electrical converter 131 for monitoring, and an electrical band pass filter 132.

A signal outputted from the optical pre-amplifier 1 is branched by the optical branching section 130 and is converted to a corresponding electrical signal by the optical to electrical converter 131 for monitoring. Then, the useless intensity modulating component frequency within a fixed band is selected and passed by the electrical filter 132.

The useless intensity modulating component frequency is led to a feed-back circuit 14. The feed-back circuit 14 controls the frequency in a direction for canceling an exciting voltage for exciting laser 10 in correspondence to the useless intensity modulating component frequency.

If fluctuation of an exciting laser driving current is set within approximately 1 kHz, when employing an Erbium Doped Fiber optical amplifier, it is recognized by the inventors of the present invention that it is possible to change gain following to the driver current. Therefore, if the intensity modulating component is within 1 kHz, it is possible to suppress the useless component.

Further, in the second embodiment, as explained above, the useless intensity modulating component detector 13 is formed of an optical branching section 130, an optical to electrical converter 131, and an electrical filter 132. Optical branching section 130 may be formed of an optical part of a bulk, and more particular, it can be formed of a fusion type optical coupler.

A photo diode can be employed as the optical to electrical converter 131. The electrical filter 132 can be formed of a usual electrical device. A low-pass filter may be employed other than the above-described band-pass filter.

However, in the case of employing the band-pass filter, the central frequency should be corresponding to a polarization scrambling frequency fscr or a monitor control signal frequency fsv. In the case of employing the low-pass filter, a high cutoff frequency should be higher than the polarization scrambling frequency fscr or the monitor control signal frequency fsv. In the case of employing the low-pass filter, it is possible to simultaneously suppress the optical signal modulation component in a frequency, which is less than the high cutoff frequency.

Figure 6:
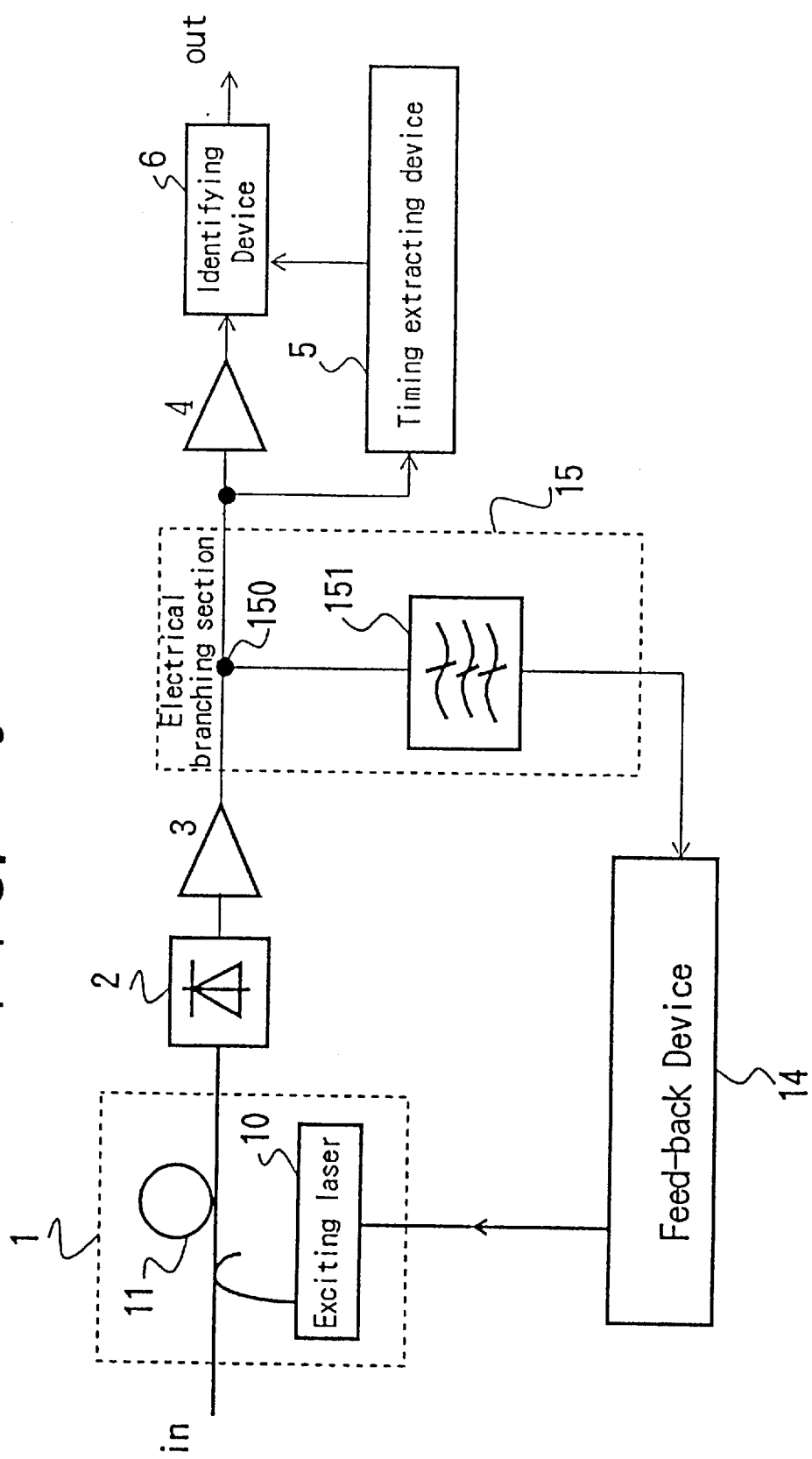
FIG. 6 is a block diagram of a third embodiment of the present invention.

FIG. 6 shows a structural block diagram of a third embodiment of the present invention. It is different from the embodiment shown in FIG. 5 of the present invention in that a position for detecting the useless intensity modulation component led to the feed-back circuit 14 is different. In the embodiment shown in FIG. 6, the useless intensity modulation component detector 15, is provided between the amplifiers 3 and 4.

The useless intensity modulating component detector 15 includes an electrical filter 151, such as a band-pass filter or a low-pass filter. The signal converted to the electrical signal by the optical to electrical converter 2 for a main signal is inputted through the amplifier 3 to the useless intensity modulating component detector 15. Further, the signal is branched in the electrical branching section 150 in the useless intensity modulation component detector 15, and only the useless intensity modulation component can be outputted through the electrical filter 151.

The useless intensity modulation component is led to the feed-back circuit 14. Then, similar to the above-described embodiment shown in FIG. 5, controlling the exciting voltage for exciting the laser 10 is performed in a direction for canceling the useless intensity modulating components in correspondence with the size of the useless intensity modulation components.

In this way, the embodiment shown in FIG. 6 is the same as the embodiment shown in FIG. 5 except branching in the electrical branch circuit, after converting the main signal to the electrical signal. It is possible to suppress the useless intensity modulation component by feeding back to the exciting laser of the rare-earth doped fiber type optical pre-amplifier, similar to the optical receiver shown in FIG. 5. Other structure and function are the same as those shown in FIG. 5.

Figure 7:
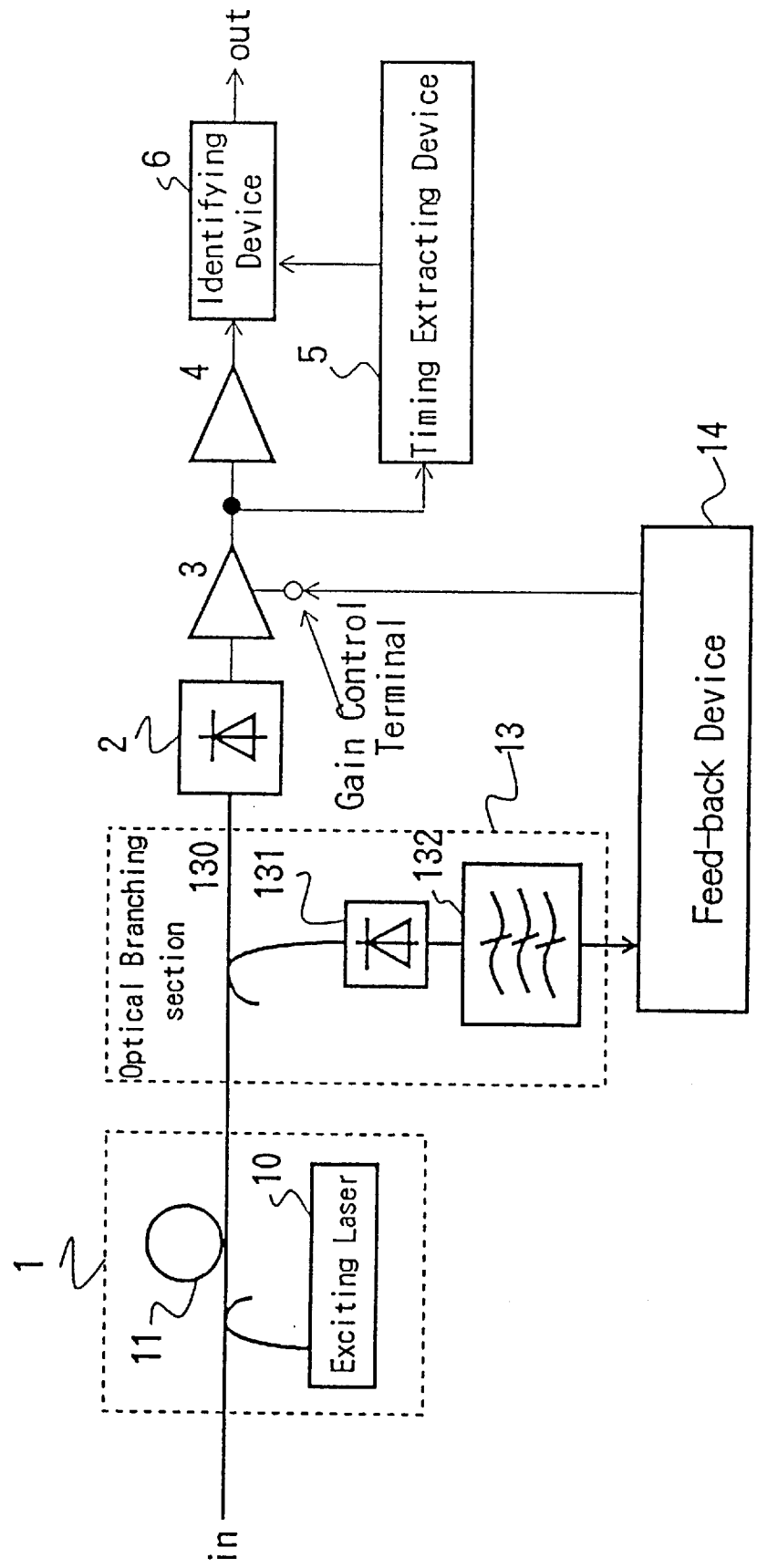
FIG. 7 is a block diagram of a fourth embodiment of the present invention.

FIG. 7 is a block diagram of a fourth embodiment of the present invention. The embodiment shown in FIG. 7 is an example for forward feed-backing. In FIG. 7, the useless intensity modulating component detector 13 is the same as the embodiment shown in FIG. 5. However, an AGC amplifier is employed as the amplifier 3, the feed-back circuit 14 automatically controls the gain of the AGC amplifier 3 in a direction for canceling the useless components in correspondence with the size of the useless intensity modulation component detected by the useless intensity modulation component detector 13. Accordingly, the embodiment shown in FIG. 7 employs the feed-forward type detector.

FIG. 8 shows a structural block diagram of an optical receiver, as a fifth embodiment of the present invention, which is combined with FIGS. 6 and 7. The useless intensity modulation component detector 15 is formed by an electric circuit, similar to the structure shown in FIG. 6. Further, an AGC amplifier is employed as an amplifier 3, similar to the structure shown in FIG. 5. The output signal detected in the useless intensity modulation component 15 is fed-back to the AGC amplifier 3 through the feed-back circuit 14. Accordingly, in the embodiment shown in FIG. 8, as compared with FIG. 7, the gain of the AGC amplifier 3 is controlled by feeding back.

As described above, in the embodiment shown in FIG. 8, an electrical AGC amplifier 3, which can control the gain with the gain control voltage, is employed in an electrical device for a main signal in the optical receiver, as well as the embodiment shown in FIG. 7 to suppress the intensity modulation component by reducing the gain, when increasing the signals detected from the useless intensity modulation component detector 15, and increasing the gain, when decreasing the detected signal.

FIGS. 9A and 9B show a structural block diagram of a sixth embodiment of the present invention. The embodiment shown in FIGS. 9A and 9B is an example, which can correspond to any structures shown in FIGS. 5 through 8 by switching the input and output of the feed-back circuit 14.

It is possible to suppress the useless intensity modulation components by employing the useless intensity component detector 15 in an electrical signal group shown in FIGS. 5 and 6, or suppress the useless intensity modulation component by employing the useless intensity modulation component detector 15.

Further, in FIGS. 9A and 9B, the feed back circuit 14 comprises an adding circuit 140 to add an offset value to a detected signal. More particularly, the detected signal A is inputted to feed-back circuit 14, when the output is B, as well as those of the embodiment shown in FIG. 5, the input is A', the output is B, corresponding to the embodiment shown in FIG. 6, the input is A, and the output is B', corresponding to the embodiment shown in FIG. 7, and the input is A', and the output is B', corresponding to the embodiment shown in FIG. 8.

There are two cases of structuring the useless intensity modulation component detector in an optical signal group as shown in FIGS. 5 and 7 and the case of structuring the detector in an electrical signal group as shown in FIGS. 6 and 8. Further, there are two patterns of a feed-back type system as shown in FIGS. 5 and 6, and a feed-forward type system as shown in FIGS. 7 and 8, as a method for feeding back the useless intensity modulation components.

Further, there are two systems for feed-backing so as to control the driving current of the exciting laser 10 of the optical pre-amplifier 1 as a feed-back destination, and a system for feeding back so as to control the gain of the electrical AGC amplifier 3.

Four structures of an optical receiver can be used with the above-described combination. The feed-back circuit 14 shown in FIG. 9B feeds back a signal F (t), in which an offset is added to the detected signal V1 (t) (refer to FIG. 10B), back to the input optical signal, as shown in FIG. 10A. The feed-back circuit 14 gives a feed-back signal F (t) (refer to FIG. 10C), so that the signal gain is reduced, when increasing the useless intensity modulation component of the input signal light, and the signal gain is increased, when the useless intensity modulation component is reduced.

Accordingly, the phase of the detected signal V1 (t) (refer to FIG. 10B) is reversed to that of the feed back signal F (t) (refer to FIG. 10C). Further,signal gain of an averaged feed-back signal F (t) is determined by the offset value.

Figure 11A:
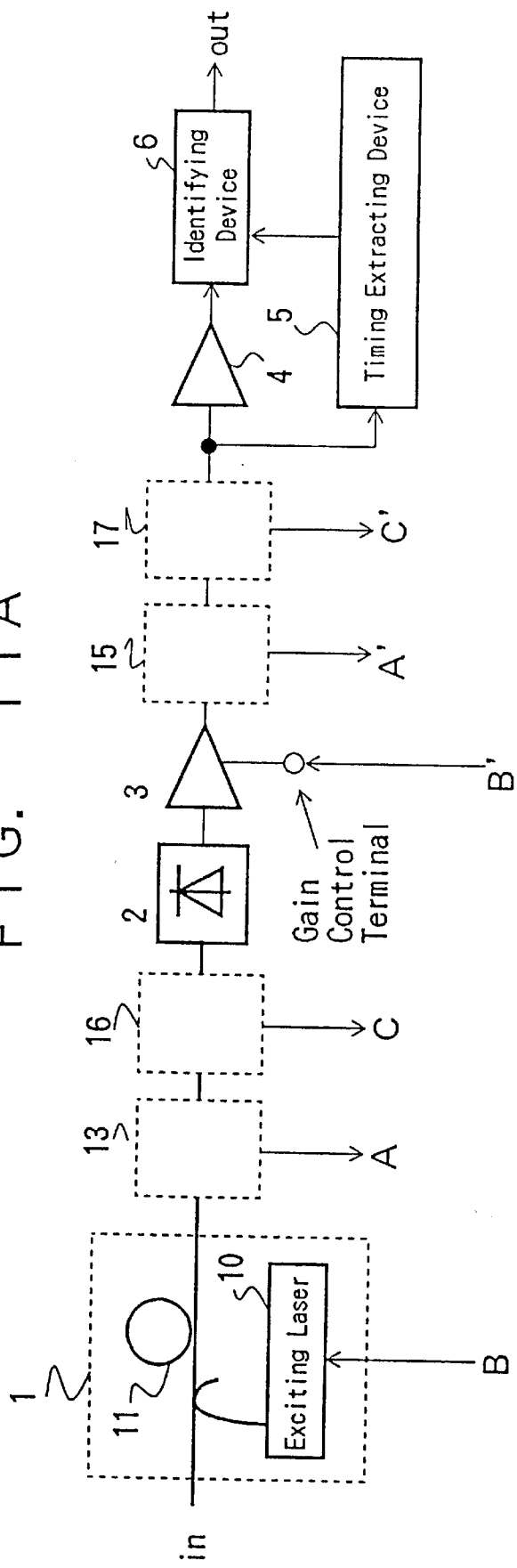
FIGS. 11A and 11B show a block diagram of a seventh embodiment of the present invention.
Figure 11B:
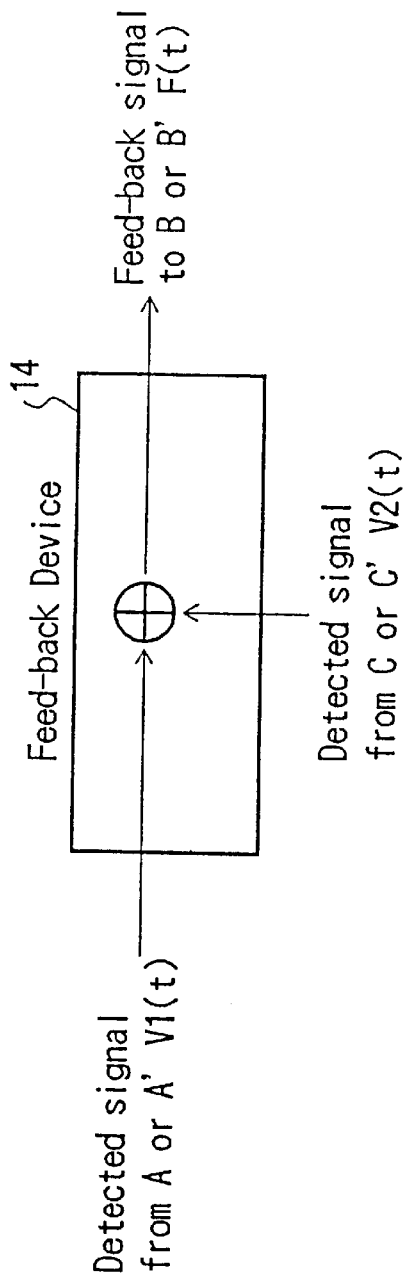

FIGS. 11A and 11B show a structural block diagram of a seventh embodiment of the present invention. FIGS. 12A to 12D show waveforms explaining the operations of the seventh embodiments. In the embodiment shown in FIG. 11A and 11B, a first signal level detector 16 is provided on the precedent stage of the useless intensity modulation component detector 15, and a second signal level detector 17 is provided on the rear stage of the useless intensity modulation component detector 15 in addition to a structure of the embodiment shown in FIGS. 9A and 9B.

That is, the optical receiver includes a useless intensity modulation component detector 13 or 15, and the first signal level detector 16 or the second signal level detector 17.

The feed-back circuit 14 in the optical receiver feeds the signal V1 (refer to FIG. 12B) detected from the useless intensity modulation component detector 13 or 15 back to the input signal light (refer to FIG. 12A), and the feed back signal F (t) (refer to FIG. 12D) back to the gain control voltage of the electrical AGC amplifier 3 or the driving current of the exciting laser diode 10 of the optical pre-amplifier 1 according to the signal V2 (refer to FIG. 12C) detected from the signal level detectors 16 and 17.

Accordingly, the feed-back circuit 14 gives the feed back signal so as that the signal gain is reduced, when increasing the useless intensity modulation component of the input optical signal and the signal gain is increased, when reducing the useless intensity modulation component, and the signal gain is reduced, when increasing the signal level, and the signal gain is increased, when reducing the signal level (refer to the relationship between FIGS. 12A and 12D).

The feed-back circuit 14 controls the signal gain to keep the signal level constant according to the detected signal V2, and suppress the useless intensity modulation component according to the detected signal V1.

Figure 13:
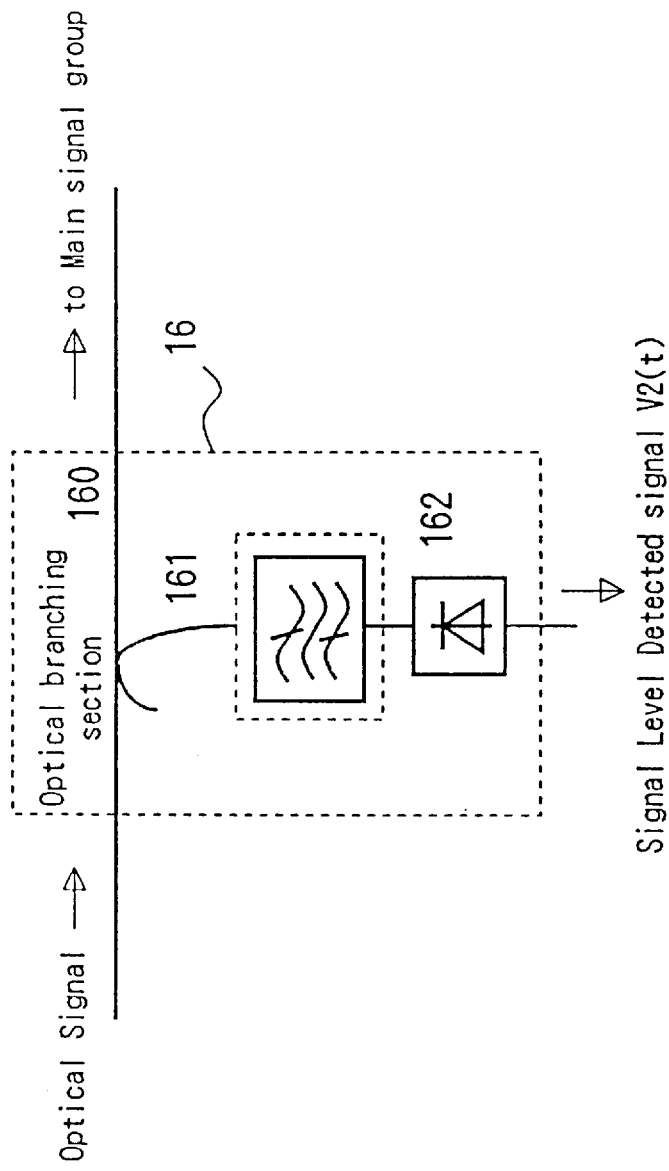
FIG. 13 shows a structural block diagram of the level detector 16.

FIG. 13 shows a structural example of the signal level detector 16 shown in FIGS. 11A and 11B. The optical to electrical converter 162 converts the branched optical signal or the optical signal after cutting off the Amplified Spontaneous Emission (ASE), which is a component amplified caused by the optical amplifying in the optical filter to an electrical signal. Thereby, the electrical signal proportioned to the signal level can be extracted.

If an error of detecting signal level according to the ASE optical signal becomes larger, the ASE optical signal is cut off by providing the optical filter 161 between the optical branching section 160 and the optical to electrical converter 162 to pass only the optical signal.

The optical branching section 160 may be formed of a bulk optical component device or a fusion type optical coupler. It is possible to use a photo diode as an optical to electrical converter 162.

Figure 14:
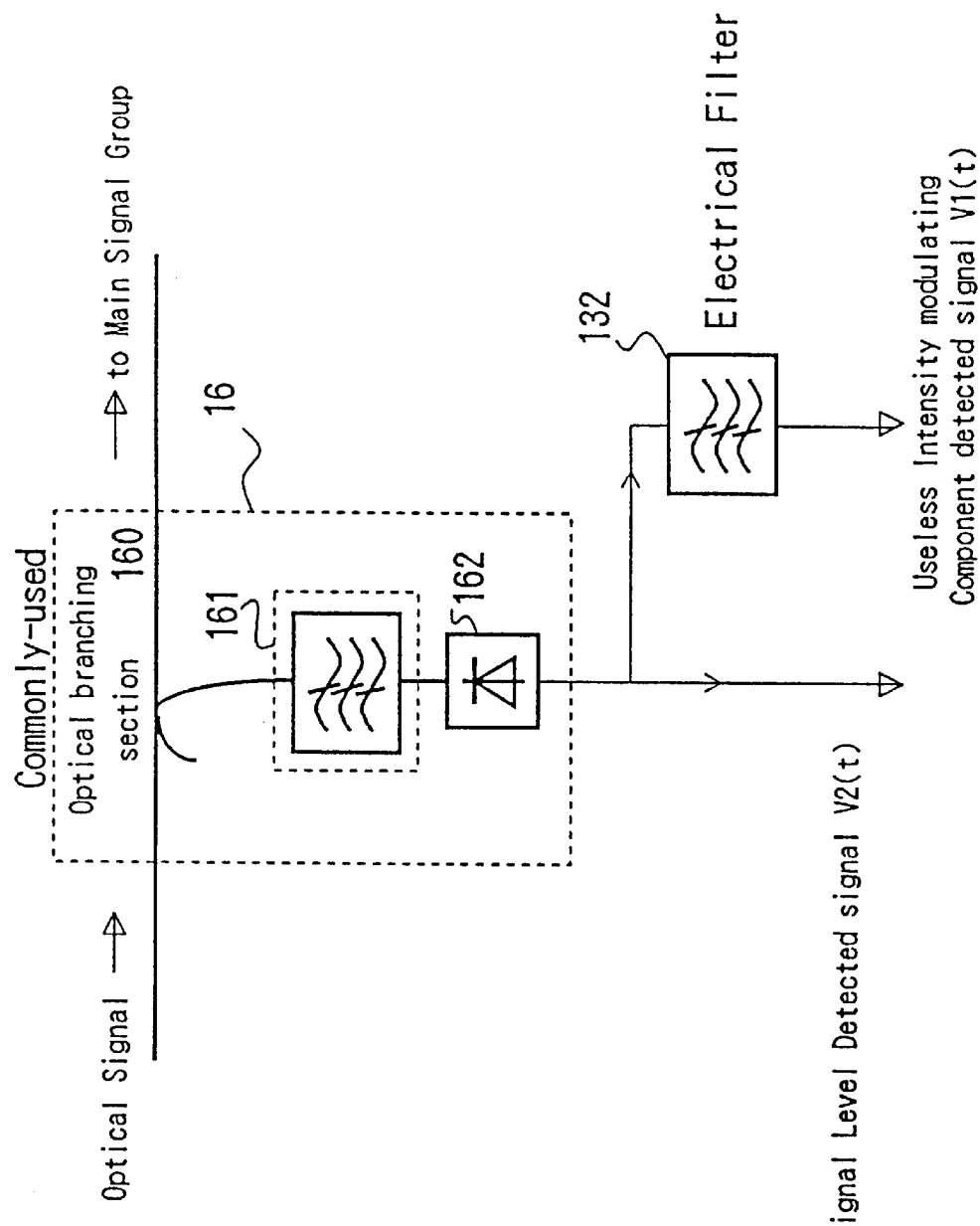
FIG. 14 shows another structural block diagram of the level detector 16.

FIG. 14 shows another structural example of the level detector. More particularly, it shows a circuit, which commonly uses the optical branching section 160 and the optical to electrical converter 162 in the optical receiver shown in FIG. 13. This circuit can be employed to use the optical branching section 160 and the O/E converter 162 in common.

The signal outputted from the optical to electrical converter 162 in a common section is employed as a signal level detected signal V2 (t). The useless intensity component detecting signal V1 (t) is obtained by branching and passing the signal V2 (t) through the electrical filter 132.

Figure 15:
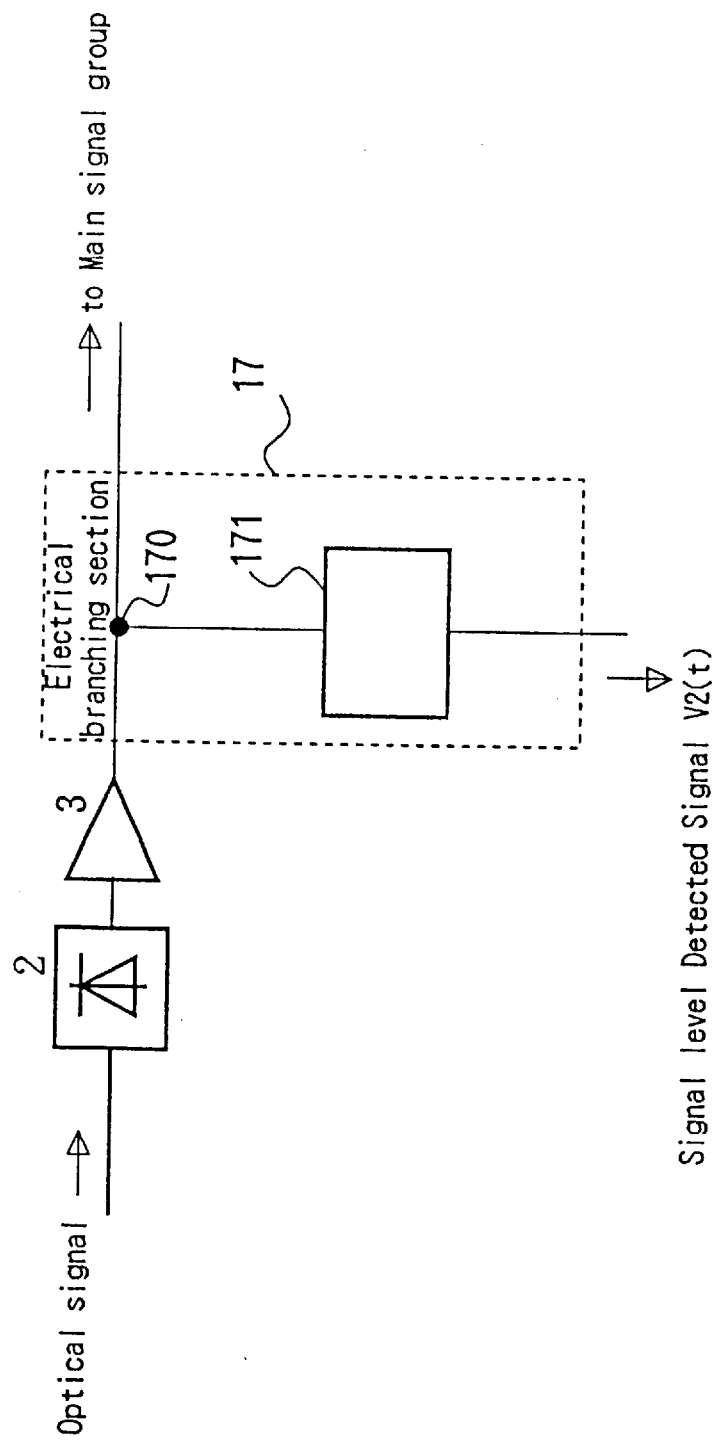
FIG. 15 shows a structural block diagram of the level detector 17.

FIG. 15 is a structural example of a level detector 17. The level detector 17 is formed of an electrical branching section 170 and an envelop detector 171. The signal level detecting signal V2 (t) can be obtained by branching the signal in an electrical main signal group, and extracting an envelop level of the electrical signal, i.e., the electrical signal proportioned to the signal amplitude.

Figure 16:
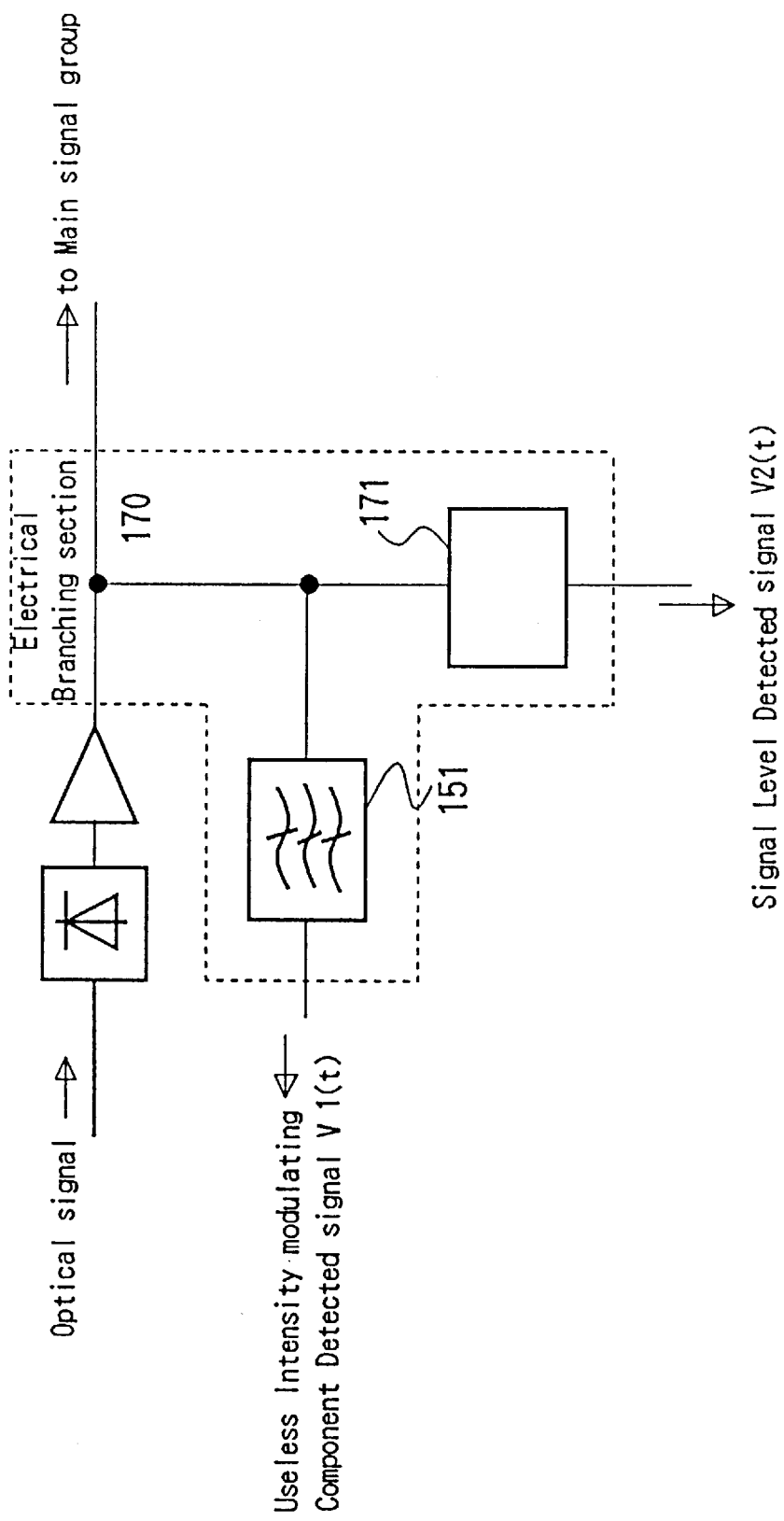
FIG. 16 shows another structural block diagram of the level detector 17.

FIG. 16 is another structural example of a level detector 17. The example shown in FIG. 16 is constructed by combining the signal level detector 17 shown in FIG. 15 and the useless intensity modulation component detector 15 shown in FIG. 8 in common. After branching from the main signal group by the common electrical branching section 170, the signals are branched by the electrical branching circuit. It is possible to form the circuit so as that one end is led to an envelop detector 171 as a signal level detector, and other end is inputted to the electrical filter 151 as the useless intensity modulation component detector.

Therefore, the useless intensity modulation component detecting signal V1 (t) and the signal level detecting signal V2 (t) can be obtained from the commonly-used circuit.

As explained according to the embodiments, the present invention can realize to block or suppress the unless intensity modulation component. Therefore, a receive characteristic in the optical receiver can be improved.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical receiver having a function of suppressing an intensity modulation component comprising:
   an optical to electrical converter for converting an optical main signal to an electrical signal;
   an optical amplifier for amplifying the optical main signal provided on a preceding stage of the optical to electrical converter;
   a detector for detecting an intensity modulation component of the optical main signal due to polarization scrambling frequency or a monitor control signal frequency; and
   a feed-back device for feeding the detected signal obtained by the detector back to the optical amplifier so as to control a gain in a frequency band of the intensity modulation component signal, the frequency band being lower than a frequency band of the optical main signal.

2. An optical receiver comprising:
   an optical to electrical converter for receiving an optical main signal, of which polarization is scrambled with a first frequency and for converting the optical main signal to an electrical signal;
   an optical amplifier for amplifying the optical main signal provided on a preceding stage of the optical to electrical converter;
   an electrical amplifier for amplifying the converted electrical signal provided on a succeeding stage of the optical to electrical converter;
   a detector for detecting an intensity modulation component of the converted electrical signal, of which frequency is the same as the first frequency; and
   a feed-back device for feeding the detected signal obtained by the detector back to the optical amplifier or the electrical amplifier to control a gain in a frequency band of the intensity modulation component, the frequency band being lower than a frequency band of the optical main signal.

3. An optical receiver having a function of suppressing an intensity modulation component, comprising:
   an optical to electrical converter for converting an optical main signal to an electrical signal;
   an electrical amplifier for amplifying the optical main signal, provided on a succeeding stage of the optical to electrical converter;
   a detector for detecting an intensity modulation component of the optical main signal due to a polarization scrambling frequency or a monitor control signal frequency; and
   a feed-back device for feeding the detected signal obtained by the detector back to the electrical amplifier, so as to control a gain in a frequency band of the intensity modulation component signal, of which the frequency band being lower than a frequency band of the optical main signal.

4. The optical receiver according to claim 3, wherein the electrical amplifier includes an AGC amplifier, and the feed-back circuit feeds the detected signal obtained by the detector back to a gain control voltage for the AGC amplifier.

5. An optical receiver for suppressing an intensity modulation component, comprising:

a converter to convert an optical main signal to an electrical signal;

a detector to detect an intensity modulation of the electrical signal due to a polarization scrambling frequency or a monitor control signal frequency; and a feedback device to control a gain in a frequency band of the intensity modulation component signal, wherein the frequency band is lower than a frequency band of the optical main signal.

* * * * *

UNITED STATES PATENT AND TRADEMARK OFFICE
CERTIFICATE OF CORRECTION

PATENT NO. : 5,841,571
DATED : November 24, 1998
INVENTOR(S) : Terahara

It is certified that error appears in the above-identified patent and that said Letters Patent is hereby corrected as shown below:

Col. 1, line 19, change "amplifier the" to --amplifier. The---;
line 23, delete "is" (first occurrence);
line 57, change "make" to --makes--;
line 65, delete "of which sizes"; change "by a" to --at--.

Col. 2, line 26, delete "it".

Col. 3, line 58, change "Ω" (both occurrences) to --Ω--;
line 67, change "Ω" to --Ω--.

Signed and Sealed this

Fifteenth Day of June, 1999

Attest:

Q. TODD DICKINSON

*Attesting Officer*     *Acting Commissioner of Patents and Trademarks*